A. T. PAGE.
Wind-Wheels.

No. 146,200. Patented Jan. 6, 1874.

WITNESSES:
E. Wolff

INVENTOR:
A. T. Page
BY
ATTORNEYS.

AM. PHOTO-LITHOGRAPHIC CO. N.Y. (OSBORNE'S PROCESS)

UNITED STATES PATENT OFFICE.

ARTHUR T. PAGE, OF GARDEN PRAIRIE, ILLINOIS.

IMPROVEMENT IN WIND-WHEELS.

Specification forming part of Letters Patent No. 146,200, dated January 6, 1874; application filed December 13, 1873.

*To all whom it may concern:*

Figure 1:
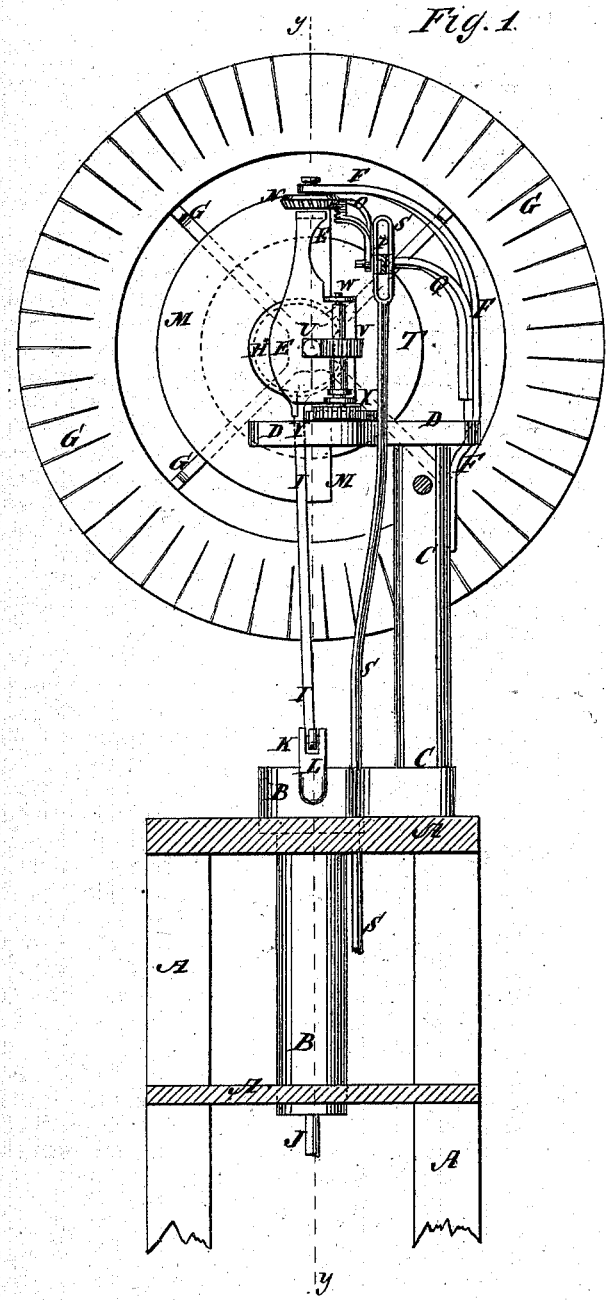
Figure 2:
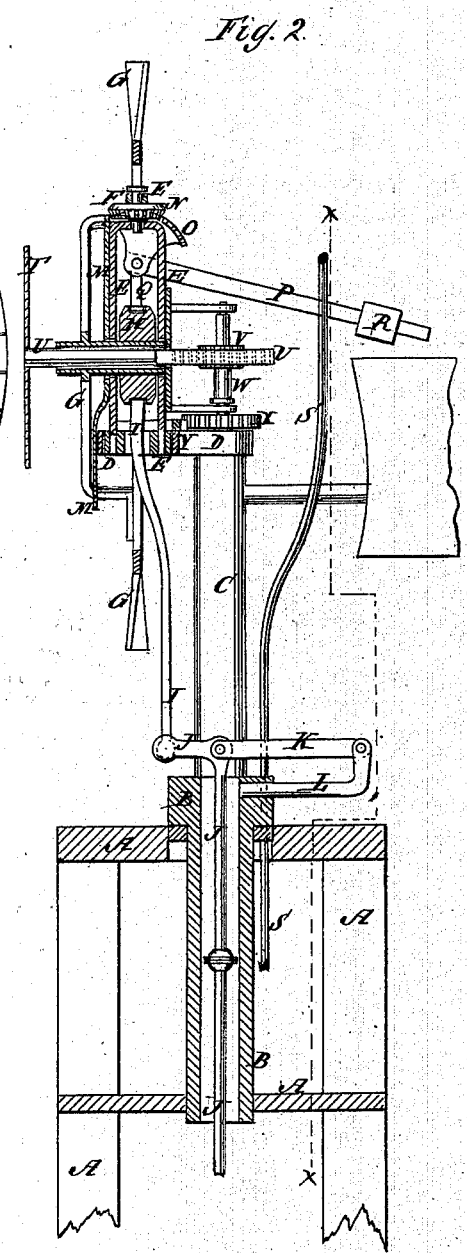

Be it known that I, ARTHUR T. PAGE, of Garden Prairie, in the county of Boone and State of Illinois, have invented a new and useful Improvement in Wind-Wheels, of which the following is a specification:

Figure 1 is a rear view of my improved wind-wheel, partly in section, through the line $x\,x$, Fig. 2. Fig. 2 is a detail vertical section of the same, taken through the line $y\,y$, Fig. 1.

Similar letters of reference indicate corresponding parts.

My invention has for its object to furnish an improved wind-wheel, pivoted at its center and evenly balanced, so that the wind will have no power to hold it out of or bring it into the wind without the application of special mechanism for that purpose. The invention consists in the pivoting-frame arranged in connection with the concaved and dished wheel, as hereinafter fully described; in the combination of the fan, the gear-wheel, the toothed rack, the lever, and the adjustable weight with the wind-wheel and its pivoting-frame; and in the combination of the center fan, the toothed shaft, the gear-wheels, and the stationary segmental gear-wheel with the hollow hub of the wind-wheel, with the pivoted frame, and with the gear-wheel, the toothed rack, the lever, and the adjustable weight, as hereinafter fully described.

A represents the frame or tower, by which the wind-wheel is supported. In bearings in the upper part of the frame or tower A works a short vertical hollow shaft or cylinder, B, to one side of the upper end of which is rigidly attached a vertical post, C, having a horizontal arm, D, rigidly attached to its upper end, thus forming an offset, as shown in Fig. 1. In the outer end of the arm D is formed a socket to receive the lower end of the frame or slotted pivot E, the upper end of which is pivoted to the upper end of a bent arm, F, the lower end of which is securely attached to the upper part of the post C. G is the wind-wheel, the spider or frame of which is made with an offset or dish at or near the inner ends of the fans, so as to form a concavity upon one side of the wheel to receive the pivoting device and bring it into or near the plane of the said wheel. The hub of the wind-wheel G passes through and revolves in bearings in the frame or pivot E, and upon it, within said frame E, is formed, or to it is rigidly attached, an eccentric wheel, H, to which is connected, by a strap, the upper end of the rod I, which passes down through the open lower end of the frame E, is made with an offset or bend to pass around the rim of the wheel G, and is connected, by a ball-and-socket joint, with the end of the rod J, which is bent at right angles, passes down through the hollow cylinder B, and is connected with the machinery to be driven. The rod J is swiveled so that it may not interfere with the turning of the wheel upon the frame or pivot E, as it is thrown into and out of the wind, and the turning of the hollow cylinder B in its bearings as the direction of the wind changes. To the angle of the rod J, at the upper end of the hollow cylinder B, is pivoted the end of a short rod, K, the outer end of which is pivoted to the outer end of an arm, L, formed upon or attached to the upper part of the hollow cylinder B. The device K L prevents friction by keeping the rod J in the middle part of the cavity of the said cylinder B. M is a semicircular fan or wing placed in the cavity of the wheel G and attached to the pivot or frame E, so that it may not be carried around by the hub of the wheel G, upon which it rides. The fan M is thus always at the same side of the wheel, so that the said wheel may be thrown out of the wind by the pressure of the wind upon the said fan M. To the upper end of the frame E is attached a small gear-wheel, N, into the teeth of which mesh the teeth of a curved rack, O, attached to the end of a lever, P, which is pivoted to an arm, Q, rigidly attached to the arm F. To the free end of the lever P is attached a weight, R, of such a size as to balance the effect of the fan M, and thus hold the wheel to the wind under ordinary circumstances; but, should the force of the wind increase, the weight R will be overbalanced, and the wheel turned out of the wind sufficiently to bring the fan and weight again into equilibrium, the wheel being thus self-adjusting. S is a rod, having a slot or loop in its upper end, through which the lever P passes, and which passes down through a guide-hole in the collar of the hollow cylinder B, into such a position that it may be conveniently reached and operated by the attendant to throw the wheel out of and into the wind when desired. T is a circular fan attached to the outer end of a shaft, U, which passes in through the hub of the wheel G, and has teeth formed upon the side of its inner part, into which teeth mesh the teeth of the small gear-wheel V, attached to a short vertical shaft, W, which works in bearings in brackets attached to the frame E. To the lower end of the shaft W is attached a small gear-wheel, X, the teeth of which mesh into the teeth of a segment of a gear-wheel, Y, attached to the arm D. By this construction the pressure of the wind upon the circular fan T will assist the fan M in turning the wheel out of the wind. Z is the vane, the shank of which is attached to the upper part of the post C, and which is made with an offset, to allow the wind-wheel G, when thrown out of the wind, to come into line with the vane Z.

Having thus described my invention, I claim as new and desire to secure by Letters Patent—

1. The frame or pivot E, arranged in connection with the concaved or dished wheel G, substantially as herein shown and described.

2. The combination of the fan M, gear-wheel N, toothed rack O, lever P, and adjustable weight R with the wheel G and pivoted frame E, substantially as herein shown and described.

3. The combination of the center fan T, the toothed shaft U, the gear-wheels V X, and the stationary segmental gear-wheel Y with the hollow hub of the wheel G, with the pivoted frame E, and with the gear-wheel N, toothed rack O, lever P, and adjustable weight R, substantially as herein shown and described.

ARTHUR T. PAGE.

Witnesses:
M. M. BOYCE,
WILLIAM M. BOYCE.